(12) United States Patent
Waters et al.

(10) Patent No.: US 7,940,041 B2
(45) Date of Patent: May 10, 2011

(54) METHOD OF DETERMINING THE AMOUNT OF TRAVEL OF A ROTATING COMPONENT

(75) Inventors: Robert Lyngle Waters, Austin, TX (US); Michael Charles Spalding, Hudson, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/762,054

(22) Filed: Apr. 16, 2010

(65) Prior Publication Data

US 2010/0201354 A1   Aug. 12, 2010

Related U.S. Application Data

(62) Division of application No. 11/428,966, filed on Jul. 6, 2006, now Pat. No. 7,728,583.

(51) Int. Cl.
G01B 7/30 (2006.01)
(52) U.S. Cl. .................................. 324/207.25
(58) Field of Classification Search .................. None
See application file for complete search history.

(56) References Cited

U.S. PATENT DOCUMENTS

| | | | |
|---|---|---|---|
| 3,719,887 A | 3/1973 | Shimizu et al. | |
| 3,917,988 A | 11/1975 | Payne | |
| 4,114,435 A | 9/1978 | Patton et al. | |
| 4,142,152 A * | 2/1979 | Fincher | 324/165 |
| 4,156,467 A | 5/1979 | Patton et al. | |
| 4,319,134 A | 3/1982 | Weber | |
| 4,331,918 A | 5/1982 | Dunch | |
| 4,386,270 A | 5/1983 | Ezekiel | |
| 4,806,752 A | 2/1989 | Fischer | |
| 4,951,505 A | 8/1990 | Seiler | |
| 4,982,189 A | 1/1991 | Dammeyer | |
| 5,319,557 A * | 6/1994 | Juman | 701/97 |
| 5,336,996 A * | 8/1994 | Rusnak | 324/207.2 |
| 5,367,257 A * | 11/1994 | Garshelis | 324/207.22 |
| 5,435,181 A | 7/1995 | Koebernik | |
| 5,557,450 A | 9/1996 | Sun | |
| 5,949,051 A | 9/1999 | Kiriyama | |
| 6,029,951 A | 2/2000 | Guggari | |
| 6,087,654 A | 7/2000 | Durham, III | |
| 6,455,957 B1 | 9/2002 | Chitayat | |
| 6,556,005 B1 | 4/2003 | Oomkes | |
| 6,628,741 B2 | 9/2003 | Netzer | |

(Continued)

FOREIGN PATENT DOCUMENTS

GB    2272291 A  *  5/1994

(Continued)

*Primary Examiner* — Jay M Patidar
(74) *Attorney, Agent, or Firm* — Armstrong Teasdale LLP

(57) ABSTRACT

A method of determining the amount of travel of a rotating component that includes a rotor shaft includes providing a self-contained magnetically-powered encoder. The encoder includes an encoder rotor that extends outward from a sealed housing such that a clearance gap is defined between the rotor and housing. The method also includes rotatably coupling the encoder to the rotor shaft. The method further includes measuring a first position of the encoder rotor and determining a first rotational position measurement of the rotor shaft based on the encoder rotor. The method also includes rotating the rotor shaft to a second rotational position and determining a direction of rotation and a second rotational position measurement of the rotor shaft using the encoder. The method further includes determining a total rotational distance traveled by the rotor shaft between the first rotational position and the second rotational position.

8 Claims, 4 Drawing Sheets

U.S. PATENT DOCUMENTS

| | | | |
|---|---|---|---|
| 6,693,422 B2 * | 2/2004 | Lutz | 324/207.2 |
| 7,253,610 B2 | 8/2007 | Nagae | |
| 7,295,000 B2 * | 11/2007 | Werth | 324/166 |
| 7,345,468 B2 * | 3/2008 | Okada et al. | 324/165 |
| 2003/0173957 A1 * | 9/2003 | Shen et al. | 324/207.26 |
| 2004/0113608 A1 * | 6/2004 | Ichida et al. | 324/174 |
| 2005/0212366 A1 | 9/2005 | Yoshiyama et al. | |
| 2008/0036454 A1 | 2/2008 | Landrieve | |

FOREIGN PATENT DOCUMENTS

| | | | |
|---|---|---|---|
| JP | 60256063 A | * | 12/1985 |
| JP | 60256064 A | * | 12/1985 |

* cited by examiner

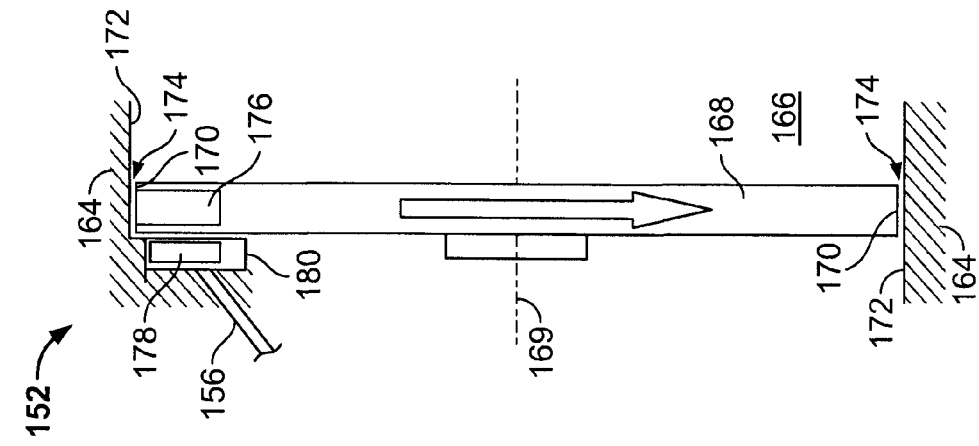
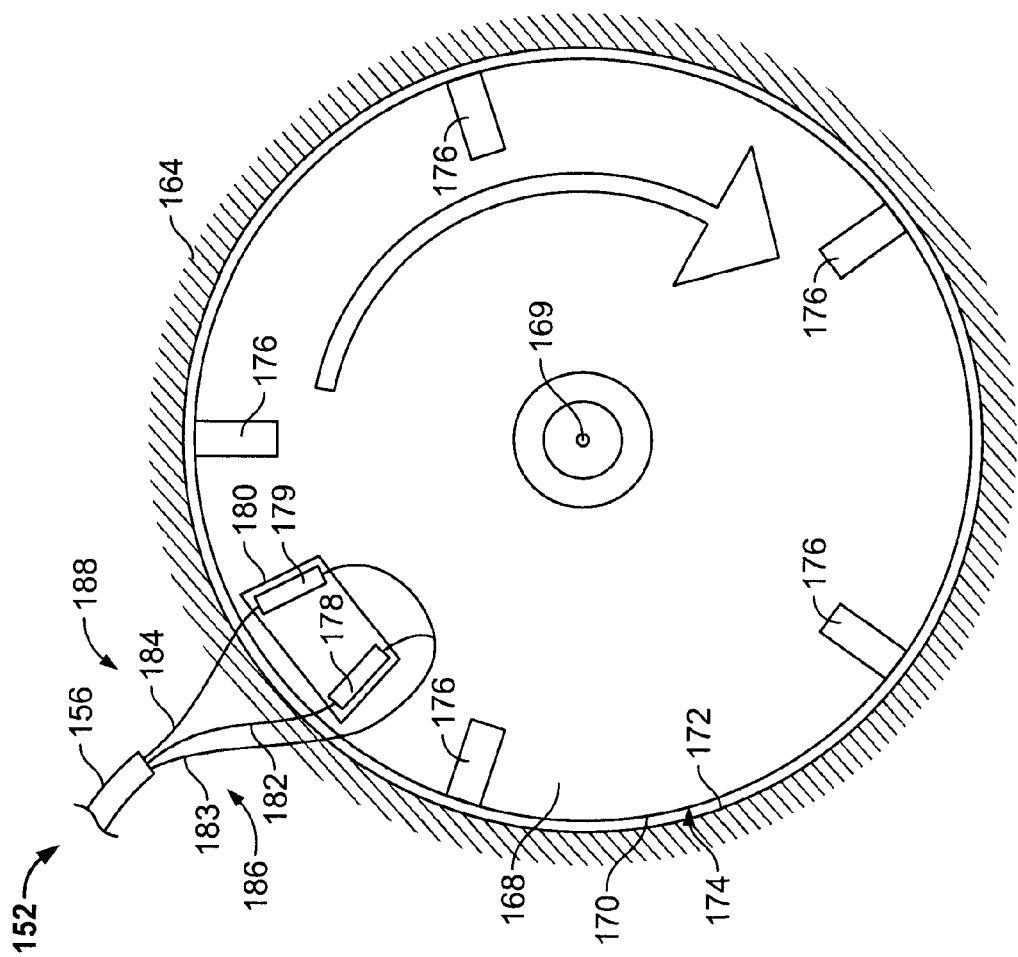

METHOD OF DETERMINING THE AMOUNT OF TRAVEL OF A ROTATING COMPONENT

CROSS-REFERENCE TO RELATED APPLICATIONS

This application is a divisional of U.S. patent application Ser. No. 11/428,966, filed Jul. 6, 2006 now U.S. Pat. No. 7,728,583, which is hereby incorporated by reference and is assigned to the assignee of the present invention.

BACKGROUND OF THE INVENTION

This invention relates generally to rotary machines and more particularly, to methods and apparatus for monitoring rotary machines.

Some known wells, such as oil wells, are formed by drilling a borehole within a natural formation below the surface of the Earth. Such formations may be found below land-based surfaces and/or submerged surfaces. Some known drilling methods use powered rotating equipment to induce torque to a drill pipe that subsequently rotates a drill bit. The rotating drill bit bores into the formation and generates cuttings of the formation to form a drilling well while appropriate fluids that facilitate transporting the cuttings to the surface are circulated within the well. The drill pipe is lowered and raised within the drilling well by a support cable extending from a drawworks drum. When rotating, the drawworks drum extends and retracts the cable to cause the drill pipe to be lowered and raised, respectively. A pre-determined rate and amount of drill bit movement within the drilling well is influenced by a number of variables that include, but are not limited to a hardness of the formations being drilled and/or a need to withdraw the drill pipe from the well to replace the drill bit. Facilitation of the drilling activities is at least partially attained by determining a depth of the drill bit within the well. The drill bit depth is typically attained by monitoring the length of drill pipe inserted into the drilling well, as well as the rate and direction of movement of the drill pipe.

To facilitate determining such drill bit depth, some known drilling assemblies include drill bit measurement devices including encoders that measure the rotation of the drawworks drum. The encoders transmit data to a monitoring system that correlates rotation of the drawworks drum to a drill pipe depth. However, because some known encoders require an external power source to supply a power level above 0.25 watts and voltages above 24 volts DC, such encoders may not be suitable for use in areas wherein an ignitable environment may exist.

BRIEF DESCRIPTION OF THE INVENTION

In one aspect, a method of determining the amount of travel of a rotating component that includes a rotor shaft is provided. The method includes providing a self-contained magnetically-powered encoder that includes at least one encoder rotor that extends outward from a sealed housing such that a clearance gap is defined between the rotor and housing. The method also includes rotatably coupling the encoder to the rotor shaft. The method further includes measuring a first position of the encoder rotor and determining a first linear position measurement of the rotor shaft based on the encoder rotor. The method also includes rotating the rotor shaft to a second position and determining a direction of rotation and a second linear position measurement of the rotor shaft using the encoder.

In another aspect, an encoder for use with a rotary machine including at least one moveable member is provided. The encoder includes at least one sensor configured to activate via magnetic flux. The encoder is configured to dissipate electrical signals with a power amplitude that is less than approximately one microwatt.

In a further aspect, a measurement system for a drilling assembly including at least one rotatable member is provided. The system includes an encoder including at least one sensor configured to activate via magnetic flux. The encoder is configured to dissipate electrical signals with a power amplitude that is less than approximately one-third of one microwatt. The system also includes at least one processor coupled in electronic data communication with the encoder via at least one input channel. The at least one processor is configured to receive and process at least one encoder output signal.

BRIEF DESCRIPTION OF THE DRAWINGS

FIG. 2 is a schematic view of an exemplary encoder that may be used with the drilling rig shown in FIG. 1;

FIG. 3 is a side view of the encoder shown in FIG. 2;

DETAILED DESCRIPTION OF THE INVENTION

Figure 1:
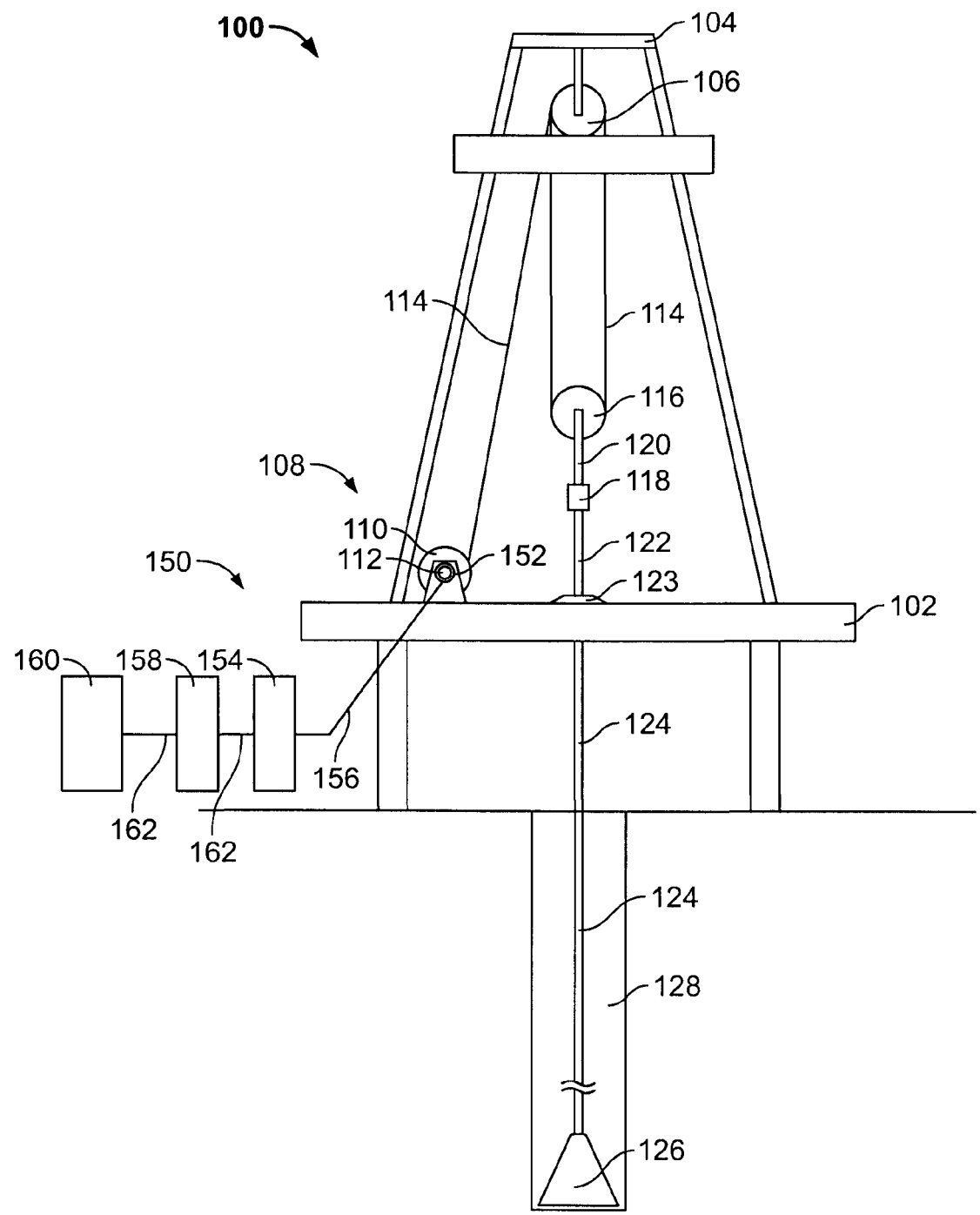
FIG. 1 is a schematic view of an exemplary well drilling rig.

FIG. 1 is a schematic view of an exemplary well drilling rig 100. In the exemplary embodiment, rig 100 is a rotary well top drive drilling rig 100. Alternatively, rig 100 may be any drilling apparatus in which the invention described herein may be embedded. Rig 100 includes a platform 102 onto which a support structure, or derrick 104, is coupled. A crown block 106 is suspended from derrick 104. Rig 100 also includes a drawworks 108 that includes a drum 110 that is powered by a power source (not shown in FIG. 1) that may include, but is not limited to, an electric drive motor. Alternatively, the power source may be any device that enables rig 100 to function as described herein. Specifically, in the exemplary embodiment, the power source is coupled to a drawworks drive shaft 112 that is rotatably coupled to drum 110.

A cable 114 is wound around drum 110 and extends from drum 110 to crown block 106. Cable 114 is coupled to crown block 106, in a manner similar to a pulley system that facilitates a pre-determined mechanical advantage thereby facilitating support of a traveling block 116 by crown block 106. Traveling block 116 supports a rotary drive apparatus 118 via a suspension member 120. In the exemplary embodiment, member 120 may include, but is not limited to being a hook and swivel assembly. Alternatively, member 120 is any device that enables rig 100 to function as described herein. Apparatus 118 is powered by a power source (not shown in FIG. 1). For example, in the exemplary embodiment, apparatus 118 is an electric motor-driven top drive 118.

Top drive 118 is rotatably coupled to a kelly 122. In the exemplary embodiment, kelly 122 is, but is not limited to being, a square or hexagonal member. Alternatively, kelly 122 may have any configuration that enables rig 100 to function as described herein. Kelly 122 is rotatably coupled to a drill pipe 124 and is configured to transfer torque from top drive 118 to drill pipe 124. A guide member 123 facilitates radial support of kelly 122. Drill pipe 124 is rotatably coupled to at least one drill bit 126 used to form a borehole or well 128. Alternative embodiments of drilling rig 100 may include a swivel joint in the place of top drive 118 and a power-driven square or hexagonal bushing in the place of guide member 123.

Rig 100 also includes a drill pipe position measurement system 150 that includes at least one encoder 152 that is rotatably coupled to drive shaft 112 and that is electrically coupled to an interface device 154 via an encoder cable 156. In the exemplary embodiment, encoder cable 156 is an insulated and shielded copper cable and device 154 is a Safe Area Interface (SAI) device 154 that is commercially available from General Electric Energy, Twinsburg, Ohio. Interface device 154 is positioned a distance from platform 102 within an environment that facilitates housing for a plurality of electronic apparatus (not shown in FIG. 1) included within device 154. Positioning device 154 in a remote location a predetermined distance from platform 102 also facilitates mitigating the potential for introducing inadvertent electrical arcing in the vicinity of well 128. Interface device 154 is electrically coupled to a data processing assembly 158 that is coupled to an operator interface terminal (OIT) 160 via a plurality of electronic cables 162. In the exemplary embodiment, electronic cables 162 are serial and/or universal serial bus (USB) cables. Also, in the exemplary embodiment, assembly 158 and OIT 160 are coupled as a portable laptop computer. Alternatively, assembly 158 and OTT 160 are separate units.

Device 154 and data processing assembly 158 both include at least one processor and a memory (neither shown in FIG. 1). As used herein, the term computer is not limited to just those integrated circuits referred to in the art as a computer, but broadly refers to a processor, a microcontroller, a microcomputer, a programmable logic controller (PLC), an application specific integrated circuit, and other programmable circuits, and these terms are used interchangeably herein. In the exemplary embodiment, memory may include, but is not limited to, a computer-readable medium, such as a random access memory (RAM). Alternatively, a floppy disk, a compact disc—read only memory (CD-ROM), a magneto-optical disk (MOD), and/or a digital versatile disc (DVD) may also be used. Also, in the exemplary embodiment, additional input channels may be coupled to computer peripherals associated with OIT 160, such as, but not limited to, a mouse and/or a keyboard. Alternatively, other computer peripherals may also be used including, for example, a scanner. Furthermore, in the exemplary embodiment, additional output channels may be coupled to additional data displays, printers, plotters and/or operational control mechanisms.

Processors for interface device 154 and assembly 158 process information, including signals received from encoder 152 and device 154. RAM devices store and transfer information and instructions to be executed by the processor. RAM devices can also be used to store and provide temporary variables, static (i.e., non-changing) information and instructions, and/or other intermediate information to the processors during execution of instructions by the processors. Instructions that may be executed include, but are not limited to including, resident conversion, calibration and/or comparator algorithms. The execution of sequences of instructions is not limited to any specific combination of hardware circuitry or software instructions.

During operation of rig 100, drill pipe 124 and drill bit 126 are suspended within well 128. Top drive 118 transfers torque and rotational movement to kelly 122 which transfers the torque and rotational movement to drill pipe 124 and drill bit 126. A downward force is also induced onto drill bit 126 by the weight of components positioned above bit 126 and this force facilitates penetration of the formation being drilled. Traveling block 116 is positioned via multiple loops of cable 114 coupled between traveling block 116 and crown block 106. To modulate the downward force induced to drill bit 126, drawworks drum 110 is rotated to withdraw or extend a portion of cable 114. The withdrawal and extension of cable 114 causes traveling block 116 to be raised or lowered such that the downward force induced on drill bit 126 is subsequently decreased or increased. Subsurface formation cuttings (not shown in FIG. 1) loosened by drill bit 126 are transported to the surface by circulation of fluids through drill bit 126 and are removed via a material removal sub-system (not shown in FIG. 1). As material is removed from well 128 and the depth of well 128 is increased, drill pipe 124 is lowered into well 128 to permit drill bit 126 to bore deeper. Specifically as drill pipe 124 is lowered, drum 110 is rotated to extend a portion of cable 114. The length of cable 114 extended may be correlated to a depth of drill pipe 124 and to a number of rotations of drum 110. Occasionally, as a depth of well 128 increases, additional sections of drill pipe 124 may need to be added to rig 100.

FIG. 2 is a schematic view of exemplary encoder 152 that may be used with well drilling rig 100 (shown in FIG. 1). FIG. 3 is a side view of encoder 152. Encoder 152 includes a housing 164 that defines an encoder internal cavity 166 therein. Housing 164 seals cavity 166 from the external environment of encoder 152 and facilitates protection from dust and water.

Encoder 152 also includes a rotor 168 that is rotatably coupled to drawworks drive shaft 112 (shown in FIG. 1). Rotor 168 extends through housing 164 via a seal assembly (not shown) that facilitates mitigating interaction between the external environment and cavity 166. Rotor 168 rotates about an axis of rotation 169. Housing 164 and rotor 168 are originated such that a radially outermost surface 170 of rotor 168 and a radially innermost surface 172 of housing 164 define a gap 174 that facilitates preventing contact between rotor 168 and housing 164 during operation of encoder 152.

Encoder 152 also includes a plurality of permanent magnets 176 that are oriented generally radially within rotor 168 such that a radially outermost portion of each magnet 176 is substantially flush with rotor surface 170. During rotation of rotor 168, magnets 176 generate a magnetic flux with a predetermined magnetic strength and orientation. In the exemplary embodiment, five magnets 176 are positioned substantially circumferentially equidistant from each other. Alternatively, any number of magnets 176 with any circumferential separation that enables encoder 152 to function as described herein may be used. One magnetic cycle is defined as the rotational travel of rotor 168 from a first magnet 176 to a circumferentially adjacent next magnet 176.

Encoder 152 further includes two magnetic reed switches 178 and 179 that are securely coupled to a switch holder 180 secured to housing 164. In the exemplary embodiment, switches 178 and 179 are approximately 18° apart to facilitate operation of encoder 152. Alternatively, switches 178 and 179 may be positioned with any degree of circumferential separation that enables encoder 152 to function as described herein. Switches 178 and 179 each have a predetermined sensitivity selected to substantially cooperate with the magnetic flux of magnets 176. In the exemplary embodiment, switches 178 and 179 are circumferentially separated at a distance that is approximately equivalent to one-quarter of a magnetic cycle and at least partially defines the relationship between a first magnetic pulse and a second magnetic pulse as magnets 176 rotate past switches 178 and 179. Moreover, in the exemplary embodiment, five magnets 176 and two switches 178 and 179 facilitate attaining a predetermined resolution of travel of drill pipe 124. A pair of common power supply conduits 182 and 184 are electrically coupled with switches 178 and 179, respectively. Conduits 182 and 184 are electrically coupled with a power supply (not shown in FIGS. 2 and 3) positioned within interface device 154 (shown in FIG. 1). Moreover, a common ground conduit 183 is electrically coupled with switches 178 and 179 on the ends of switches 178 and 179 that are opposite to the connections of conduits 182 and 184. Conduits 182, 183 and 184 are enclosed within encoder cable 156. In the exemplary embodiment, conduits 182, 183 and 184 are copper wire. Alternatively, conduits 182, 183 and 184 may be any electrically conductive devices that enable system 150 to function as described herein. Conduit 183, switch 178, and conduit 182 at least partially define a first encoder channel 186 and conduit 183, switch 179 and conduit 184 at least partially define a second encoder channel 188.

Encoder 152 facilitates reliability of system 150, and hence, drilling rig 100, due to the relatively small number of moving parts of system 150 exposed to field conditions are mitigated and are fully contained within encoder 152. Specifically, only rotor 168 and switches 178 and 179 utilize operational movement to affect the performance of encoder 152 as described herein. In the event of malfunction, encoder 152 may be easily and quickly replaced while mitigating disruption of drilling operations. Moreover, encoder 152 may be sized such that redundant encoders 152 may be coupled to shaft 112 and/or replacement encoders 152 storage requirements are mitigated.

During operation, drawworks drum 110 (shown in FIG. 1) retrieves or extends cable 114 (shown in FIG. 1) as a function of drill pipe depth within well 128 (shown in FIG. 1). As drum 110 is rotated by drawworks drive shaft 112, encoder rotor 168 is rotated in the same direction. For example, as rotor 168 is rotated in the clockwise direction (as illustrated by the arrow) a magnet 176 successively approaches, rotates by, and recedes from switch 178. Magnet 176 generates a magnetic flux with a predetermined magnetic strength and orientation such that as each magnet 176 approaches switch 178, at a predetermined circumferential distance away from switch 178, during the approach, switch 178 closes. Upon closing, switch 178 completes an electric circuit within first channel 186 such that an electric signal may be channeled from device 154 via conduit 182 through switch 178 and back to device 154 via conduit 183. Switch 178 remains closed until magnet 176 has receded a predetermined circumferential distance from switch 178. Magnets 176, device 154, and the components of second channel 188 including switch 179, conduit 183 and conduit 184 operate together in a similar manner. The action of each of magnets 176 closing switch 178 defines a first negative magnetic pulse edge and the action of each magnet 176 closing switch 179 defines a second negative magnetic pulse edge. This action and subsequent actions associated with interaction of each magnet 176 and switches 178 and 179 are discussed further below.

Figure 4:
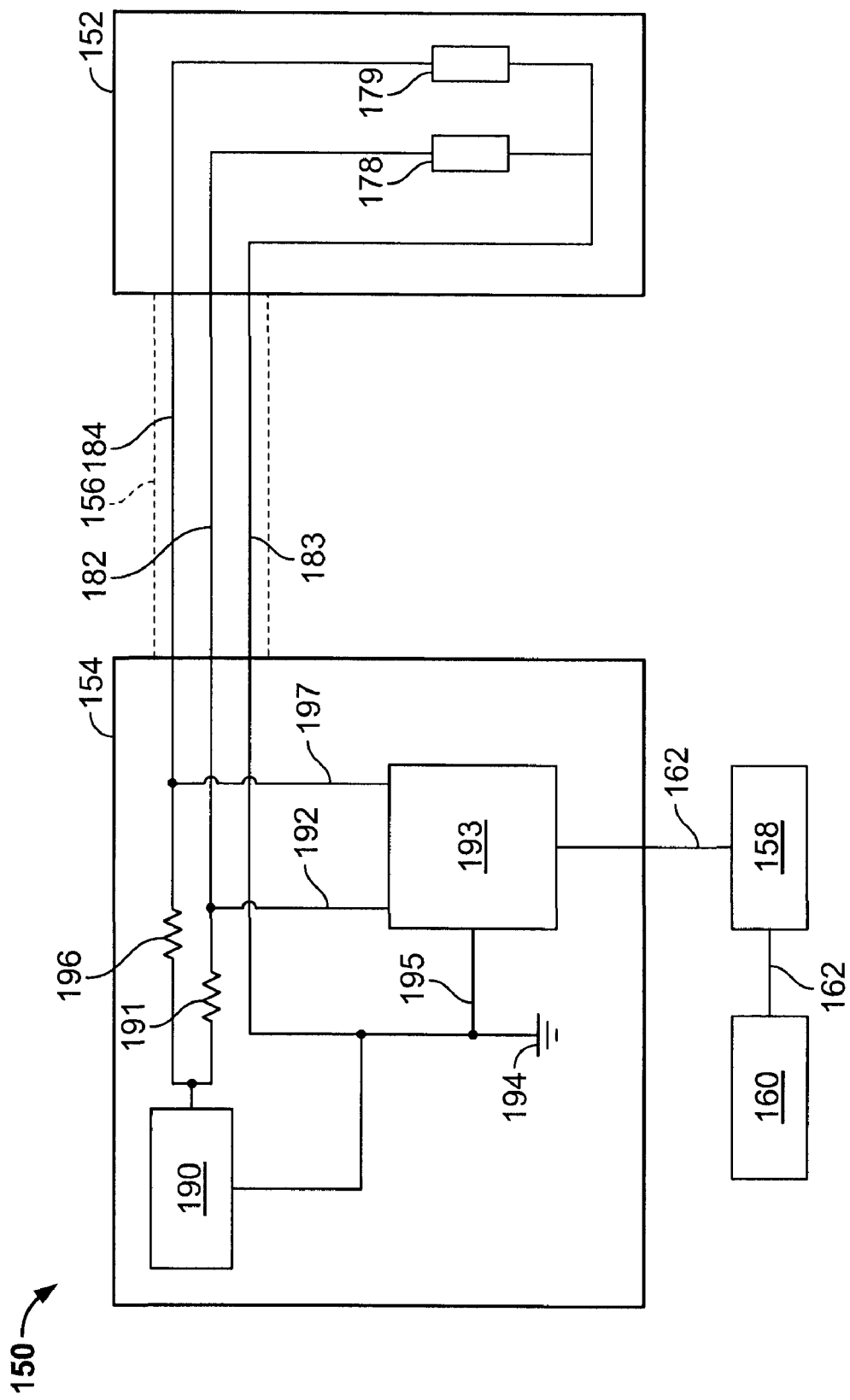
FIG. 4 is an electrical schematic of an exemplary drill pipe position measurement system that may be used with the drilling rig shown in FIG. 1.

FIG. 4 is an electrical schematic of exemplary drill pipe position measurement system 150 that may be used with drilling rig 100 (shown in FIG. 1). System 150 includes at least one encoder 152 that is electrically coupled to interface device 154 via encoder cable 156. Interface device 154 is electrically coupled to data processing assembly 158 that is coupled to an operator interface terminal (OIT) 160 via a plurality of electronic cables 162. Encoder 152 includes two magnetic reed switches 178 and 179. Common power supply conduits 182 and 184 are electrically coupled with switches 178 and 179, respectively. Moreover, common ground conduit 183 is electrically coupled with switches 178 and 179 on the ends of switches 178 and 179 that are opposite to the connections of conduits 182 and 184. Conduits 182, 183 and 184 are enclosed within encoder cable 156.

Conduit 183, switch 178, and conduit 182 at least partially define first encoder channel 186. Channel 186 further includes a 5 volt direct current (VDC) power supply 190. Channel 186 also includes a 25,000 ohm current-limiting resistor 191 electrically coupled to power supply 190 and a power supply signal conduit 192 electrically coupled to conduit 182 downstream of resistor 191. Channel 186 further includes a processor 193 electrically coupled to conduit 192. Channel 186 also includes an electrical grounding device 194 electrically coupled to conduit 183, power supply 190 and a ground conduit 195 electrically coupled to processor 193. Conduit 195 is also electrically coupled to conduit 183 upstream of grounding device 194. Resistor 191, conduit 192, processor 193, grounding device 194 and ground conduit 195 are positioned within interface device 154. Therefore, first channel 186 is defined by power supply 190, resistor 191, conduit 182, conduit 192, switch 178, conduit 183, grounding device 194, conduit 195 and processor 193. Processor 193 is coupled in electronic data communication with assembly 158 via conduit 162.

Similarly, conduit 183, switch 179, and conduit 184 at least partially define second encoder channel 188. Channel 188 further includes power supply 190, a 25,000 ohm current-limiting resistor 196 electrically coupled to power supply 190 and a power supply signal conduit 197 electrically coupled to conduit 184 downstream of resistor 196. Channel 188 also includes processor 193 electrically coupled to conduit 197. Channel 188 further includes electrical grounding device 194 and ground conduit 195. Resistor 196 and conduit 197 are positioned within interface device 154. Therefore, second channel 188 is defined by power supply 190, resistor 196, conduit 184, conduit 197, switch 179, conduit 183, grounding device 194, conduit 195 and processor 193.

Figure 5:
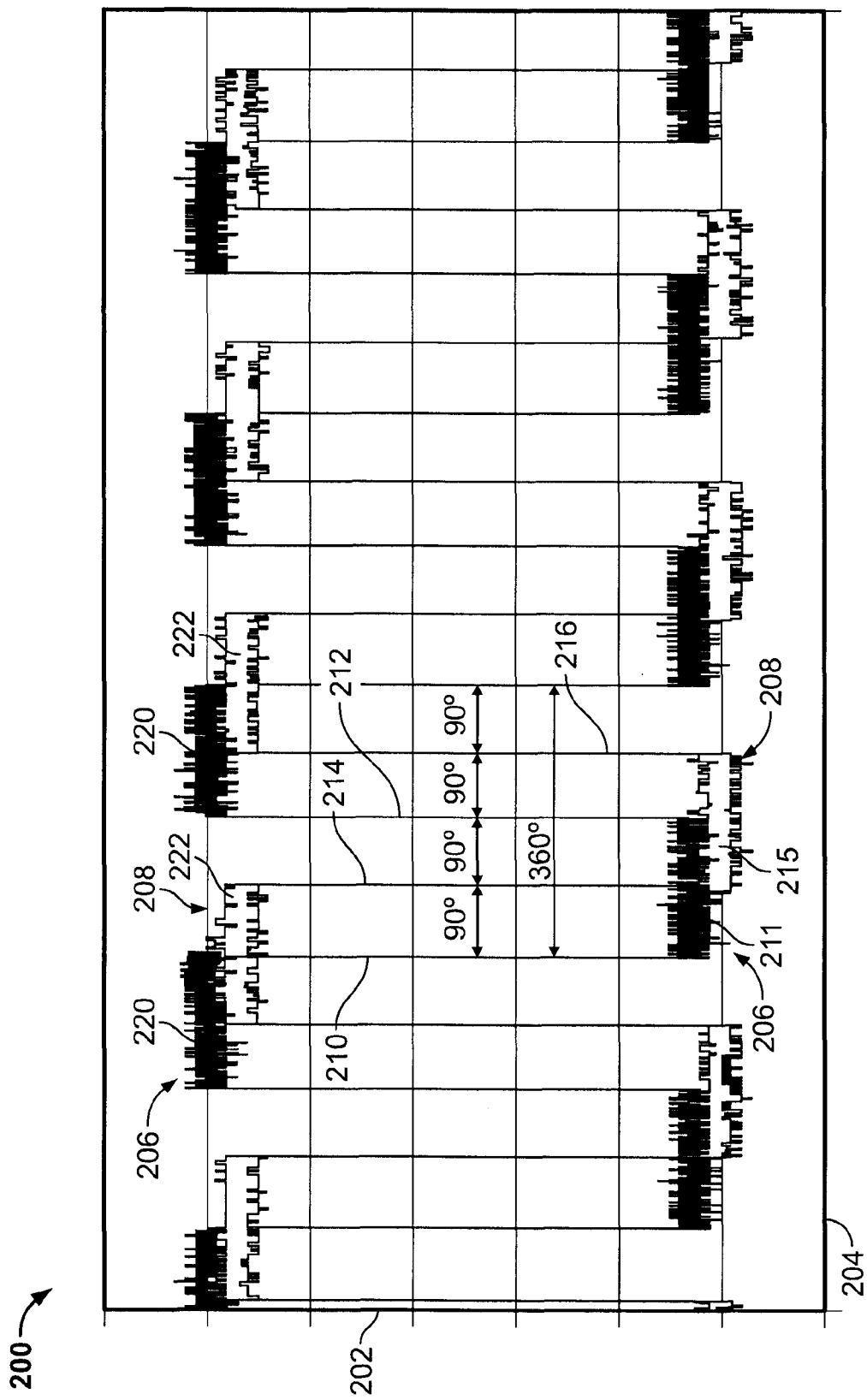
FIG. 5 is an exemplary graphical representation of waveforms that may be produced using the encoder shown in FIG. 2.

FIG. 5 is an exemplary graphical representation 200 of a plurality of waveforms that may be produced using encoder 152 (shown in FIGS. 2 and 3) and system 150 (shown in FIG. 4). Ordinate 202 (Y-axis) represents an amplitude of an output signal voltage from switches 178 and 179 (both shown in FIGS. 2 and 4) in voltage units. Abscissa 204 (X-axis) represents time units. Switch 178 facilitates channeling a first channel output signal 206 via first channel 186 (shown in FIGS. 2 and 4) and switch 179 facilitates channeling a second channel output signal 208 via second channel 188 (shown in FIGS. 2 and 4). Signals 206 and 208 are substantially square-waved signals and are illustrated as slightly offset from each other in amplitude for clarity.

Signals channeled within first channel 186 are received by processor 193 via conduits 192 and 195 and together form a first channel signal 206. An approximately five VDC voltage differential is applied to switch 178 via power supply 190, resistor 191, conduits 183 and 182, and grounding device 194 (all shown in FIG. 4). Grounding device 194 facilitates substantially all signals channeled through conduit 195 to have a voltage amplitude of approximately zero VDC throughout operation of system 150. When switch 178 is in an open condition electric current flow through first channel 186 is substantially zero. Moreover, a signal that has a voltage amplitude of approximately five VDC is channeled through conduit 192. Signal 206 includes a first channel "switch 178 open" output portion 220 that represents a period of time switch 178 is open, as well as an associated value of a voltage differential between conduits 192 and 195. Portion 220 graphically represents this voltage differential.

Similarly, signals channeled within second channel 188 are received by processor 193 via conduits 197 and 195 and together form a second channel signal 208. An approximately five VDC voltage differential is applied to switch 179 via power supply 190, resistor 196, conduits 183 and 184, and grounding device 194 (all shown in FIG. 4). Grounding device 194 facilitates substantially all signals channeled through conduit 195 to have a voltage amplitude of approximately zero VDC throughout operation of system 150. When switch 179 is in an open condition electric current flow through second channel 188 is substantially zero. Moreover, a signal that has a voltage amplitude of approximately five VDC is channeled through conduit 197. Signal 208 includes a second channel "switch 179 open" output portion 222 that represents a period of time switch 179 is open, as well as an associated value of a voltage differential between conduits 197 and 195. Portion 222 graphically represents this voltage differential. In the exemplary embodiment, portions 220 and 222 of signals 206 and 208, respectively, are substantially similar.

Signal 206 also includes a first negative magnetic pulse edge 210 and a first positive magnetic pulse edge 212. Edge 210 is generated as each magnet's magnetic flux exceeds a sensitivity threshold of switch 178 as magnets 176 approach switch 178 and close switch 178. Edge 212 is generated as the magnetic flux in the vicinity of switch 178 weakens as each magnet 176 recedes away from switch 178 and switch 178 is opened. A "switch 178 closed" portion 211 of signal 206 is defined and extends between edges 210 and 212. Portion 211 is equivalent to the duration of time that the strength of the magnetic flux in the proximity of switch 178 exceeds the sensitivity threshold of switch 178 and an associated voltage differential across switch 178. When switch 178 is closed, an electric current is permitted to be channeled through first channel 186, including switch 178, from power supply 190 to grounding device 194 thereby decreasing the voltage amplitude of the signal channeled through conduit 192 to substantially zero. Therefore, the voltage differential between conduits 192 and 195 is substantially zero.

Similarly, output signal 208 also includes a second negative magnetic pulse edge 214 and a second positive magnetic pulse edge 216. Also, similarly, a "switch 179 closed" portion 215 of signal 208 is defined and extends between edges 214 and 216. When switch 179 is closed, an electric current is permitted to be channeled through second channel 188, including switch 179, from power supply 190 to grounding device 194 thereby decreasing the voltage amplitude of the signal channeled through conduit 197 to substantially zero. Therefore, the voltage differential between conduits 197 and 195 is substantially zero. In the exemplary embodiment, portions 211 and 215 of signals 206 and 208, respectively, are substantially similar.

One magnetic cycle is defined as the rotational travel of rotor 168 from a first magnet 176 to a next magnet 176. One magnetic cycle is defined in FIG. 4 as 360°, i.e., 360° is substantially equivalent to the time duration between edge 210 and the next generation event of edge 210. Subsequently, 90° is substantially equivalent to the time duration between edge 210 and edge 214. Also, 90° is equivalent to the time duration between edge 214 and edge 212, and the time duration between edge 212 and edge 216. Moreover, 90° is substantially equivalent to the time duration between edge 216 and the next generation event of edge 210. This sequence of events is substantially replicated for each magnetic cycle. In the exemplary embodiment, encoder 152 includes five magnets 176 and each 360° rotation of encoder rotor 168 (shown in FIGS. 2 and 3) generates five magnetic cycles. Therefore, each magnetic cycle is substantially equivalent to 72° of rotation of rotor 168 and each quadrant of the 360° magnetic cycle, i.e., 90° of the magnetic cycle is substantially equivalent to 18° of rotation of rotor 168.

Signal 206 leads output signal 208 as encoder 152 rotates in a clockwise direction. In contrast, signal 208 leading output signal 206 indicates encoder 152 is rotating in a counter-clockwise rotation. In the exemplary embodiment, the amplitude of voltage output signals 206 and 208 during portions 220 and 222, respectively, is approximately five volts DC and substantially zero amperes current is channeled through switches 178 and 179. In contrast, the amplitude of voltage output signals 206 and 208 from switches 178 and 179, respectively, during portions 211 and 215 is approximately zero volts DC. Moreover, during periods when portions 211 and 215 overlap, less than one-third of one microwatt of power is dissipated by system 150.

The exemplary magnitudes of voltage, current and power associated with system 150, including encoder 152, as described herein facilitate reducing potential for inadvertent electrical arcing associated with encoder 152 having sufficient energies to induce ignition of predetermined materials and compounds. Moreover, in the exemplary embodiment, encoder 152 is not electrically coupled to any significant external power sources, i.e., power sources that are configured to transmit more than one microwatt of power. As such, encoder 152 may be used in applications wherein an intrinsically safe device is required, such as, but not limited to, Class I, Division 1 conditions. Such conditions may exist within facilities that include, but are not limited to, chemical plants, grain elevators, and natural gas transfer stations. Alternatively, any values of voltage, average power, peak power, average current and peak current that facilitates operation of encoder 152 as described herein may be used.

Referring again to FIG. 1, during operation of rig 100 as cable 114 is extended from and refracted towards drum 110 to vary a depth of drill pipe 124, encoder 152, that is rotatably coupled to drawworks shaft 112, facilitates channeling output signals 206 and 208 that are transmitted to interface device 154 via conduits 182 and 184, respectively. Encoder 152 is an incremental encoder 152 in that it measures relative depth from a starting depth and measures depth changes upward or downward from that starting depth. A preliminary set of data that corresponds to an initial starting depth is manually input into system 150. Device 154 and data processing assembly 158 receive a first set of signals 206 and 208 and assembly 158 uses at least one resident conversion algorithm to determine a first distance of drill pipe 124. As shaft 112 rotates to change the depth of drill pipe 124 to a second position, a second set of signals 206 and 208 are channeled to device 154 that uses at least one resident conversion algorithm to determine the number and polarity of magnetic cycles. The number and polarity of magnetic cycles as determined by device 154 is transmitted to data processing assembly 158 wherein a plurality of conversion algorithms are executed to determine a distance of movement of drill pipe 124, a direction of movement, and a rate of movement. Examples of conversion algorithms may include, but are not limited to, integration algorithms to convert the number and polarity of magnetic cycles that are representative of the distance and direction of movement of drill pipe 124, to values that may be interpreted by an operator. The processed signals are subsequently transmitted to OIT 160.

The methods and apparatus for monitoring a rotary machine shaft as described herein facilitate operation and monitoring of a rotary drilling rig. More specifically, the rotary encoder described herein facilitates an efficient and effective drill pipe depth measurement scheme. Also, the rotary encoder facilitates operation of a passive operating system with self-contained low-power components and no external power requirements, and is intrinsically safe in hazardous environments. Further, the rotary encoder also facilitates enhancing drilling rig reliability, and reducing maintenance costs and drilling rig outages. Moreover, the rotary encoder also facilitates operation of facilities that include, but are not limited to, chemical plants, grain elevators, and natural gas transfer stations.

Exemplary embodiments of rotary encoders as associated with drill pipe depth measurement schemes are described above in detail. The methods, apparatus and systems are not limited to the specific embodiments described herein nor to the specific illustrated drilling rig.

While the invention has been described in terms of various specific embodiments, those skilled in the art will recognize that the invention can be practiced with modification within the spirit and scope of the claims.

The invention claimed is:

1. A method of determining the amount of travel of a rotating component including a rotor shaft, said method comprising:
   providing a self-contained magnetically-powered encoder that includes at least one encoder rotor that extends outward from a sealed housing such that a clearance gap is defined between the rotor and housing;
   rotatably coupling the encoder to the rotor shaft;
   measuring a first position of the encoder rotor;
   determining a first rotational position measurement of the rotor shaft based on the encoder rotor;
   rotating the rotor shaft to a second rotational position;
   determining a direction of rotation and a second rotational position measurement of the rotor shaft using the encoder; and
   determining a total rotational distance traveled by the rotor shaft between the first and second rotational positions.

2. A method in accordance with claim 1 wherein providing an encoder further comprises:
   providing an encoder including a plurality of magnets coupled within at least a portion of the rotor; and
   coupling a plurality of switches to at least a portion of the housing, wherein the plurality of switches are oriented to receive magnetic flux generated from the plurality of magnets.

3. A method in accordance with claim 1 wherein rotatably coupling the encoder to the rotor shaft comprises:
   providing a drawworks including a least one cable drum rotatably coupled to a drive shaft; and
   rotatably coupling the encoder to the drawworks drive shaft.

4. A method in accordance with claim 3 wherein measuring a first position of the encoder rotor comprises coupling a drilling tool to at least one cable that is coupled to the drawworks cable drum.

5. A method in accordance with claim 1 wherein determining a first rotational position comprises transmitting the encoder first position measurement to a remote processor that is programmed with at least one conversion algorithm.

6. A method in accordance with claim 1 wherein rotating the rotor shaft to a second position comprises re-positioning a drilling tool by rotating a cable drum and the at least one encoder rotor substantially simultaneously.

7. A method in accordance with claim 1 wherein determining a direction of rotation and a second rotational position measurement of the rotor shaft comprises rotating at least one encoder magnet having a magnetic flux past at least one encoder switch, wherein the magnetic flux generated causes one of opening and closing the at least one switch.

8. A method in accordance with claim 1 wherein determining a direction of rotation and a second rotational position measurement of the rotor shaft comprises:
   rotating at least one encoder magnet having a magnetic flux past a plurality of encoder switches that are spaced circumferentially across a surface of the encoder housing, wherein the magnetic flux generated causes one of opening and closing of at least one encoder switch;
   generating a plurality of output signals based on the movement of each encoder switch; and
   transmitting the plurality of encoder output signals to a remote processor that includes at least one of a direction of rotation algorithm, and at least one conversion algorithm.

* * * * *